United States Patent [19]

Havens et al.

[11] Patent Number: 5,033,253

[45] Date of Patent: Jul. 23, 1991

[54] PROCESS FOR SKIN PACKAGING ELECTOSTATICALLY SENSITIVE ITEMS

[75] Inventors: Marvin R. Havens, Greer; Stephen L. Fowler, Moore; George J. McCrary, Jr., Moore; Alfred P. Engelmann, Greenville, all of S.C.

[73] Assignee: W. R. Grace & Co.-Conn., Duncan, S.C.

[21] Appl. No.: 439,123

[22] Filed: Nov. 17, 1989

Related U.S. Application Data

[62] Division of Ser. No. 069,350, Jul. 2, 1987, abandoned.

[51] Int. Cl.$^5$ .................... B65B 53/02; B65B 25/00
[52] U.S. Cl. .................................. 53/427; 53/434; 53/442; 53/472
[58] Field of Search .............. 53/472, 427, 442, 405, 53/510, 557, 556, 434, 432; 206/328

[56] References Cited

U.S. PATENT DOCUMENTS

| | | |
|---|---|---|
| 3,355,319 | 11/1967 | Rees . |
| 3,491,504 | 1/1970 | Young et al. . |
| 3,545,163 | 12/1970 | Mahaffy et al. . |
| 3,694,991 | 10/1972 | Perdue et al. . |
| 3,756,399 | 9/1973 | Cosier et al. . |
| 3,845,163 | 10/1974 | Murch . |
| 4,275,544 | 6/1981 | Hisazumi et al. ............... 53/433 |
| 4,293,070 | 10/1981 | Ohlbach ........................ 53/472 X |
| 4,311,752 | 1/1982 | Diedrich et al. .............. 428/220 |
| 4,375,851 | 3/1983 | Paulos .......................... 206/471 |
| 4,537,011 | 8/1985 | Bortolani et al. ............. 53/509 |
| 4,590,741 | 5/1986 | Long et al. ................... 53/427 |
| 4,597,920 | 7/1986 | Golike .......................... 264/22 |
| 4,677,809 | 7/1987 | Long et al. ................... 53/427 |
| 4,769,433 | 9/1988 | Chanzy et al. ............... 526/348.1 |
| 4,790,433 | 12/1988 | Raszewsi ..................... 53/472 X |
| 4,963,427 | 10/1990 | Botto et al. .................. 428/215 |

FOREIGN PATENT DOCUMENTS

| | | |
|---|---|---|
| 245774 | 2/1963 | Australia . |
| 50808 | 11/1988 | Australia . |
| 0066149A1 | 12/1982 | European Pat. Off. . |
| 0168928A3 | 1/1986 | European Pat. Off. . |
| 0228818 | 9/1987 | European Pat. Off. . |
| 0244982 | 11/1987 | European Pat. Off. . |
| 1286018 | 1/1961 | France . |
| 59-227420 | 12/1984 | Japan ............................ 526/348.1 |
| 207210 | 2/1984 | New Zealand . |
| 203113 | 4/1986 | New Zealand . |
| 211770 | 9/1987 | New Zealand . |
| 211688 | 1/1988 | New Zealand . |
| 937807 | 9/1963 | United Kingdom . |
| 2111508A | 7/1983 | United Kingdom . |
| 2128199A | 4/1984 | United Kingdom . |

OTHER PUBLICATIONS

Photograph of scissors packaged with "Tuff-Skin" from Startex at p. 17, Packaging, Sep. 1987.
Encyclopedia of Polymer Science and Technology, Plastics, Resins, Rubbers, Fibers, published by John Wiley & Sons, Inc. and copyrighted in 1966, pp. 331 to 414, vol. 4.
Federal Test Method Standard 101C, Method 4046.1, "Electrostatic Properties of Materials".

*Primary Examiner*—James F. Coan
*Attorney, Agent, or Firm*—John J. Toney; William D. Lee, Jr.; Jennifer L. Skord

[57] ABSTRACT

Disclosed is a skin packaging film for skin packaging high profile and/or heavy articles. The film comprises linear ethylene/alpha-olefin copolymer. In one embodiment, the film is antistatic and may be employed for skin packaging of electro-static sensitive items such as circuit boards.

2 Claims, 2 Drawing Sheets

PROCESS FOR SKIN PACKAGING ELECTOSTATICALLY SENSITIVE ITEMS

This is a divisional application of application Ser. No. 069,350, filed on July 2, 1987 and now abandoned.

The present invention relates to a specific film as a skin package film for high-profile and/or heavy articles, both food and non-food items. More particularly the film comprises linear ethylene/alpha-olefin copolymer. In a preferred embodiment, the film is antistatic or static dissipative, and may be employed for skin packaging electrostatic sensitive devices, such as circuit boards.

BACKGROUND OF THE INVENTION

Skin packaging is essentially a vaccuum forming process. In a typical process, a sheet of thermoplastic film is placed in a frame, and below the frame is a vacuum plate upon which a piece of support pervious to gases such as a backing board is placed. The product to be skin packaged is positioned on top of the backing board and heat is applied to the thermoplastic film in the frame. When the film has been heated to become sufficiently soft, the frame is lowered and the plastic sheet drapes itself over the product. As this happens, a partial vacuum is created through the vacuum plate and the air underneath the plastic film is withdrawn through the backing board. The air pressure differential between the top and the bottom of the plastic sheet causes the sheet to be tightly pressed around the product. The support is adapted to bond to the plastic sheet. Typically, the film may be thermally bonded to the support, or the film may be coated with a glue or the backing board may be so coated. Where the two contact each other, a strong bond is formed resulting in a package in which the product is tightly held to the support for safe shipping and for subsequent rack display in retail stores.

Vacuum skin packaging differs from the above described skin packaging process in that both the thermoplastic film and the support are impervious to gases and the resulting package can be evacuated and hermetically sealed, if desired. The same end result is sought, i.e. the product is to be tightly held by the film to the backing board. The vacuum skin packaging process generally employs a vacuum chamber with an open top. The product on an impervious backing board is placed on a platform within the vacuum chamber. The top of the chamber is then covered by a sheet of film which is clamped tightly against the chamber to form a vacuum type closure. The chamber is evacuated while the film is heated to forming and softening temperatures. The platform can then be raised to drive the product into the softened film and air pressure can be used above the film to force it tightly around the product.

The conventional method employs a backing board which is porous or which is perforated to make it pervious to gases so that the vacuum may be drawn directly through the backing board.

The term "vacuum" as used herein means a differential fluid pressure where the fluid can be either a gas or a liquid. The term "skin packaging" as used herein is intended to refer to vacuum packaging processes as described above, regardless of whether the support is pervious or impervious. Typically the support is made of a cardboard coated with adhesive polymer so that the film sheet will adhere as the sheet is heated and draped over the article being skin packaged and a differential pressure is applied.

Various patents describe skin packaging machinery and methods. Representative patents are French Pat. No. 1,258,357 (Bresson) (Mar. 6, 1961), French Pat. No. 1,286,018 (Laroch Freres, Ltd.) (Jan. 22, 1962), Australian Pat. No. 245,774 (Colbro Proprietary Ltd., and Cole and Son Proprietary Ltd.) (July 16, 1963), U.S. Pat. No. 3,491,504 (Young et al) (Jan. 27, 1970), U.S. Pat. No. 3,545,163 (Mahaffy et al) (Dec. 8, 1970), U.S. Pat. No. 3,694,991 (Perdue et al) (Oct. 3, 1972), and U.S. Pat. No. 4,537,011 (Bortolani et al) (Aug. 27, 1985). The disclosures of these patents are hereby incorporated by reference. However, it is noted that the film of the invention may be employed with various other types of skin packaging machinery, such as the VS-44 marketed by the Cryovac Division of W. R. Grace or the PORT-A-VAC marketed be AmPak. The film of the invention is not intended to be limited to skin packaging employing only the machinery mentioned herein.

Skin packaging techniques are often disadvantageous in that an excess portion of film is undesirably wrinkled on evacuation and the packaged material or article becomes irregular in shape, thus producing a poor external appearance. In addition, the wrapping film is apt to be broken in the portions folded and wrinkled. It has been ascertained in actual practice that as the film thins in the course of the vacuum skin packaging process, conventional films, due to poor tensile strength and poor elongation, tend to be broken when subjected to high stretch or draw ratios at particular projections or recesses randomly arranged on the material being packaged. The breaking can occur during the packaging or afterwards during handling of the packaged product. Methods and films are thus unfavorable from a practical point of view. There is accordingly a strong demand for improvement in the packaging films and methods.

Conventional low density polyethylene (LDPE) is typically used for skin packaging, and attempts to provide specific improved skin packaging films have been made in the past. For instance, disclosed in U.S. Pat. No. 4,275,544 (Hisazumi et al assignors to Kureha) (June 30, 1981) is an improved method of vacuum packaging by using a specific laminated film as a package film, the laminated film being composed of a plastically deformable layer of a synthetic resin having a yield stress more than 50 kg/cm$^2$ at a temperature of 23° C. and an elongation of less than 30% at elastic limit at a shaping temperature of 50° to 180° C. and an elastic layer of a synthetic resin having an elongation of more than 40% at elastic limit at the shaping temperature. Also, disclosed in U.S. Pat. No. 4,375,851 (Paulos assignor to Bemis) (Mar. 8, 1983) is a skin packaging material composed of a film of thermoplastic material having a reinforcement consisting of strands (in the form of netting, or all extending in one direction parallel to one another) adapted on exposure for an appropriate time interval to a source of heat to have both the film and strands heat up to a forming temperature for being skin packaged around an article on a substrate, with the strands less exstensible than the film on equal heating of the film and strands, and the skin packaging of articles utilizing said material in such manner that the strands flare out from the article at the base of the article to provide a broader base of support for the article and to prevent undue thinning of the film. Also, it is known from U.S. Pat. No. 4,590,741 (Long et al assignors to General Dynamics) (May 27, 1986) to skin package electrostatically sensitive items with a 3-layer film including first and second outer layers of heat-sealable, electrically semi-conductive polyethylene each having a surface resisivity exceeding $1 \times 10^{16}$ ohms per square, and a middle layer of heat-sealable polyethylene sandwiched between and bonded to said first and second outer layers and impregnated with a sloughable, electrically-conductive material providing said middle layer with a volume resisivity no more than $1 \times 10^3$ ohms per centimeter, wherein said electrically-conductive material is prevented from sloughing to contaminate said item by said first or said second semiconductive polyethylene layer.

Accordingly, an object of this invention is to provide a suitable film for skin packaging of products, which film exhibits high tensile strength and elongation properties even at high stretch or draw ratios, whereby it is sufficiently deformable so that it can conform to the shape of the high-profile and/or heavy product being packaged by deformation without breaking. In other words, the film possesses an excellent deep draw feature affording a high draw ratio. It is another object of this invention to provide a skin packaging film for packing high profile and/or heavy products which film has antistatic characteristics. Thus, it is an aspect of the film that the film serves well as a material for packaging articles which typically have sharp projections such as bone-in meat, electronic components, and the like. The films in accordance with the present invention also typically have excellent see-through properties which is advantageous for reading code numbers preprinted on a product wrapped with the film. The films often exhibit very good adhesion to the support, particularly thermal bonding when the support is surlyn-coated cardboard.

SUMMARY OF THE INVENTION

Therefore, the present invention provides a skin packaging film comprising linear ethylene/alpha-olefin copolymer.

The present invention also provides a skin package comprising a support of a material adapted for bonding to one face thereof of a polymeric film, an article on said face of the support, and a polymeric film comprising linear ethylene/alpha-olefin copolymer.

The present invention also provides a skin packaging process comprising: a) placing an article to be packaged on a support; b) positioning a film of linear ethylene/alpha-olefin copolymer above said article and support; c) heating the film; d) evacuating gases from the space between said film and said support; and e) sealing said film against said support.

The present invention also provides a skin packaging film comprising linear ethylene/alpha-olefin copolymer, said film being suitable for skin packaging high profile or heavy articles.

The present invention also provides a skin package comprising a support of a material adapted for bonding to one face thereof of a polymeric film, an article on said face of the support and a polymeric film comprising linear ethylene/alpha-olefin copolymer, said film being sufficiently deformable whereby high profile or heavy articles can be skin packaged with the film.

The present invention also provides a skin packaging process for packaging an electro-statically sensitive item comprising: a) placing the item to be packaged on a support; b) positioning a film above said item; c) heating the film d) drawing a vacuum between said film and said support; and e) drawing the film over and around the item forming a heat seal with the support; f) wherein said film comprises an antistatic linear ethylene/alpha-olefin copolymer film.

The present invention also provides an antistatic skin packaging film comprising antistatic linear ethylene/alpha-olefin copolymer.

It is a feature of the film of the invention that it has a high draw ratio of about 20:1 or higher and thus can be employed to skin package high profile objects.

DETAILED DESCRIPTION OF THE INVENTION

Figure 1:
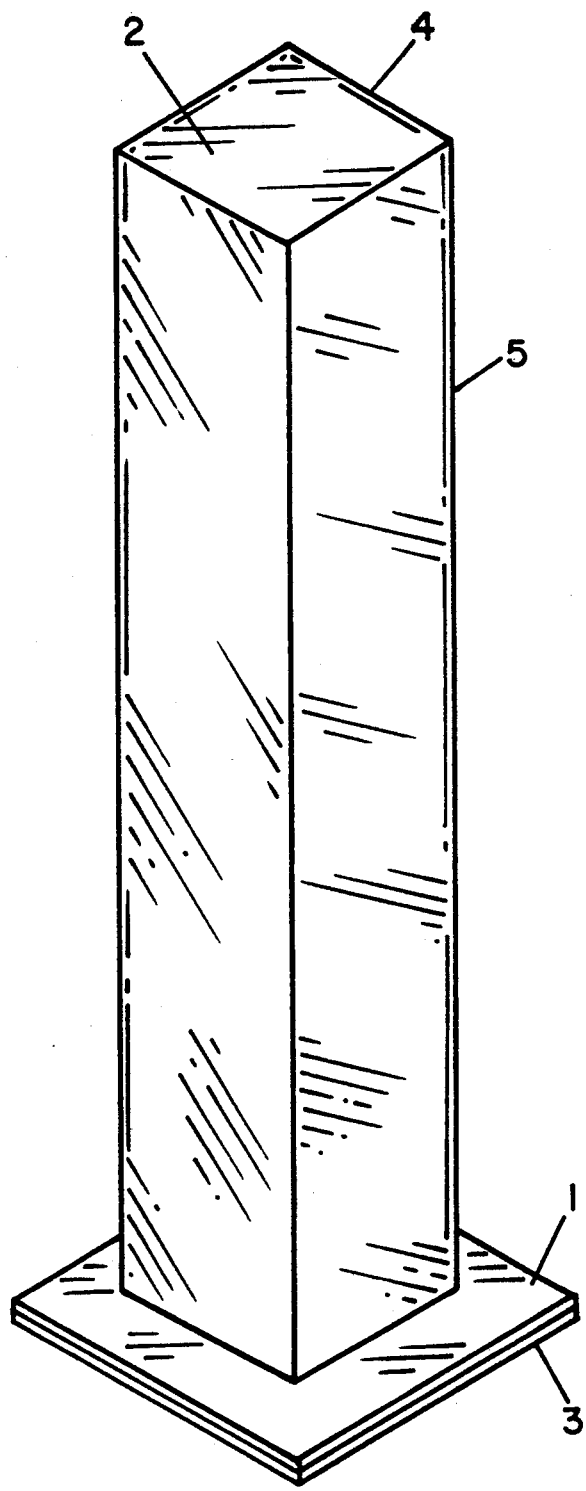
FIG. 1 is a schematic representation of a skin packaged, high profile object of rectangular cross-section in the direction horizontal to the support.

The film of the present invention exhibits excellent draw ratios and stretch whereby it is sufficiently deformable so that it can be employed to skin package high profile and/or heavy objects. By "heavy", it is intended to mean objects having a weight of about 10 pounds (about 22 kg) or more, more preferably about 15 pounds (about 33 kg) or more, more preferably about 20 pounds (44 kg) or more. By "high profile", it is intended to mean objects having a vertical dimension:minimum horizontal dimension ratio of about 20:1 or more, for instance, an essentially cylindrical object having a height of about 20 inches (50.8 cm) in the direction substantially vertical (i.e. substantially perpendicular) to the support and a base diameter of about 1 inch (2.5 cm) in the direction substantially horizontal to the support. The film exhibits an excellent deepdraw, and will skin package objects with a draw ratio of the vertical dimension:minimum horizontal dimension of the object of about 20:1 or higher, more preferably above about 25:1, most preferably above about 30:1. In a preferred embodiment as illustrated in Example I f) below, the deep draw ratio is about 64:1. Conventional LDPE works at 16:1 as can be seen in Table IIIB below, but splits at 26:1, as can be seen in Table IIIC below. Of course, the film of the invention can be employed, if desired, to skin package objects of lesser weight or shallow profile objects.

The film of the present invention comprises the polyethylene, linear ethylene/alpha-olefin copolymer. The linear ethylene/alpha-olefin copolymer may be blended with one or more suitable other polymers. Suitable other polymers are further described below. The term "linear low density polyethylene" (LLDPE) as used herein, for the linear ethylene/alpha-olefin employed in the present invention, refers to the newer copolymers of ethylene with one or more comonomers selected from $C_4$ to $C_{10}$ alpha olefins such as butene-1, pentene-1, 4-methyl-pentene-1, hexene-1, octene-1, etc. in which the molecules thereof comprise long chains with few side chains branches or cross-linked structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range of from about 0.911 g/cc to about 0.928 g/cc for film making purposes. The melt flow index of linear low density polyethylene generally ranges form between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts. Also, very low density linear low density polyethylenes (VLDPE) may be employed, and such typically have a density from about 0.910 g/cc to about 0.860 g/cc, or even lower.

Suitable other polymers which may be blended with the linear ethylene/alpha-olefin include, but are not limited to, polyethylenes other than linear ethylene/alpha olefins, ethylene vinyl acetates, and ethylene alkyl acrylates. Polyethylenes having densities ranging from about 0.900 g/cc to about 0.928 are called low density polyethylenes (LDPE) while those having densities from about 0.929 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures. Ethylene vinyl acetate copolymers (EVA) are formed from ethylene and vinyl acetate monomers wherein the ethylene derived units in the copolymer are present in major amounts and the vinyl acetate derived units in the copolymer are present in minor amounts. For film forming purposes, it is desirable that the VA content of the EVA be from about 3% to about 25% as when an EVA has a higher VA content the EVA behaves more like a glue or adhesive. Ethylene alkyl acrylate copolymers (EAA) refers to copolymers formed from ethylene and alkyl acrylate wherein the ethylene derived units in the copolymer are present in major amounts and the alkyl acrylate derived units in the copolymer are present in minor amounts. Thus, the term "ethylene-methyl acrylate copolymer" (EMA) refers to a copolymer formed from ethylene and methylacrylate monomers. The term "ethylene-ethylacrylate copolymer (EAA) refers to a copolymer formed from ethylene and ethyl acrylate monomers. The term "ethylene-butyl acrylate copolymer" (EBA) refers to a copolymer formed from ethylene and butyl acrylate monomers. Many suitable EBA's are commercially available and these have a butyl acrylate content from about 3% to about 18% by weight.

Also suitable for blending are copolymers of an alpha-olefin of the formula $RHC=CH_2$ wherein R is H or $C_1$ to $C_8$ alkyl and an alpha, beta-ethylenically unsaturated carboxylic acid, and the like. Preferably, in the $RHC=CH_2$ copolymer of an olefin and a carboxylic acid, the olefin is ethylene and the carboxylic acid is acrylic acid or methacrylic acid. Materials, which are the copolymer of an alpha-olefin having the formula $RHC=CH_2$ wherein R is H or $C_1$ to $C_8$ alkyl and an alpha, beta-ethylenically unsaturated carboxylic acid, representatively may be one of the Nucrel (TM) polymers supplied by du Pont or may be one of the Primacor (TM) polymers, supplied by Dow Chemical Company, Midland, Michigan. These are produced by the copolymerization of ethylene and a carboxylic acid comonomer therefor such as acrylic acid or methacrylic acid. Also, the copolymer of an alphaolefin having the formula $RHC=CH_2$ wherein R is H or $C_1$ to $C_8$ alkyl and an alpha, beta-ethylenically unsaturated carboxylic acid may be metal salt neutralized such as with sodium, Na. Thus, the copolymer may be an ionomer. Representatively, such an ionomeric material is commercially available as Surlyn (TM) from the E. I. du Pont de Nemours Company of Wilmington, Delaware, and is described in detail in U.S. Pat. No. 3,355,319 and U.S. Pat. No. 3,845,163.

In the preferred embodiment, the film is antistatic or static dissipative, and may be employed for skin packaging of electrostatic sensitive items such as circuit boards. Nevertheless, this embodiment of the film is also suitable for skin packaging of other products that do not need antistatic protection, such as pork, red meat, cartons of cottage cheese, boxed toys wherein one side of the box is open for viewing the toy through the plastic film skin package, and the like.

In the antistatic embodiment, the polymer contains less than about 20 percent by weight, more preferably less than about 15 percent by weight, of one or more antistatic agents. The agent(s) will generally increase the conductivity of the polymer (polymers are typically excellent insulators) by an order of magnitude up to several orders of magnitude. There is no particular method required for incorporating an agent into the polymer, and any of the well-known solvent "wet" blending, melt blending, or dry blending methods may be employed.

This antistatic embodiment may be exhibited by the ability of the polymeric film containing the agent to promote static charge decay, i.e. to dissipate a static charge. The film of polymer containing the agent is able to dissipate 99% of an applied static charge of $\pm 5000$ volts direct current in a short amount of time, i.e. less than 20, more preferably less than 5, most preferably less than 2 seconds (2000 milliseconds).

The Department of Defense (DOD) and the Electronics Industry Association (EIA) each have their own standards on surface resistivity of a material in ohms/square as follows:

| | SURFACE RESISTIVITY RANGES | | |
|---|---|---|---|
| Insulative | Antistatic | Static Dissipative | Conductive |
| DOD Greater Than $10^{14}$ | $10^{14}$ to $10^9$ | $10^9$ to $10^5$ | Less Than $10^5$ |
| EIA Greater Than $10^{13}$ | $10^{13}$ to $10^5$ | | Less Than $10^5$ |

As can be seen, there are two main differences. One is that EIA defines insulative as above about $10^{13}$ ohms/square, whereas DOD defines insulative as above about $10^{14}$ ohms/square. The other difference is that EIA has one range of about $10^{13}$ to about $10^5$ ohms/square as antistatic, which results in antistatic being synonymous with static dissipative. On the other hand, DOD divides this into two separate ranges of about $10^{14}$ to about $10^9$ ohms/square for antistatic and about $10^9$ to about $10^5$ ohms/square for static dissipative. Frequently the literature, especially older literature, equates antistatic with static dissipative in discussions about static electricity.

Thus, the term "antistatic" as used herein describes material having a surface resistivity in the range of about $10^9$ to $10^{14}$ ohms/square (Department of Defense standard) and/or a material which can dissipate 99% of an applied static charge of $\pm 5000$ volts direct current in a short amount of time, preferably less than about 20 seconds, more preferably less than about 5 seconds, most preferably less than about 2 seconds (Federal Test Method Standard 101C, Method 4046.1, "Electrostatic Properties of Materials"), and/or a material having a surface resistivity in the range of about $10^5$ to $10^{13}$ ohms/square (an alternative standard of the Electronics Industry Association).

The antistatic agents useful in the preferred embodiment of the present invention may be selected from (a) one or more fatty acid esters of polyhydroxy alcohols, (b) one or more polyalkoxylated compounds (i.e. polyethers) such as polyethylene oxides, polypropylene oxides, polybutylene oxides, polytetramethylene oxides, the reaction products of polyalkoxylates with long chain acids, the reaction products of polyalkoxylates with long chain alcohols, the reaction products of polyalkoxylates with long chain acid esters of polyhydroxyl alcohols (for instance polyalkoxylate reaction products of long chain acids, of fatty glycols, of fatty sorbitols, of fatty sorbitans, and of fatty alcohols), or a mixture thereof, or a mixture of (a) and (b). Suitable long chains in either (a) or (b) are desirably from about $C_8$ to about $C_{20}$ or higher. The polyether chains in the suitable polyalkoxylated compounds are of the formula $(-OC_xH_{2x}-)_n$ wherein x is from 2 to about 8, wherein the alkyl group is straight or branched, and wherein n is from 2 to about 1000. Each agent will work by itself in a polymeric composition, as such antistatic compositions exhibit excellent static decay times; however, the combination of agents (a) and (b) in a polymeric composition is more desirable as these antistatic compositions display even shorter static decay times. Desirable fatty acid ester substituted polyhydroxy alcohols include, but are not limited to, the polyhydroxy alcohols selected from the $C_2$ to $C_6$ alcohols, such as ethylene glycol, 1,3-propylene glycol, 1,2-propylene glycol, 1,2-butanediol, meso-2,3-butanediol, 1,4-butanediol, pinacol, pentaerythritol, 1,2,3,4,5-pentanepentol, sorbitan, or sorbitol, which polyhydroxy alcohol has been substituted with one or more fatty acid ester groups. A very desirable fatty acid ester substituted polyhydroxy alcohol is glycerol monostearate (GMS). A desirable polyether is polyethylene oxide (PEO), such as that sold by Union Carbide under the trade name Polyox, or is polytetramethylene oxide, such as that sold by du Pont under the trade name Terathane. A very desirable polyalkoxylate of a fatty alcohol is a polyethoxylated cetyl alcohol (PECA), as represented by the formula $C_{16}H_{33}-O(-C_2H_4-O-)_nH$ wherein n is from 2 to about 50. A very desirable antistatic film comprising linear ethylene/alphaolefin copolymer contains GMS, PEO, and PECA.

Advantageously, the admixture of polymer and antistatic agent also includes a small amount of about 10% by weight or less, more desirably about 7% by weight or less of an antiblock, to help alleviate any tactile tackiness. A suitable antiblock is the siloid present in EPE 8160 supplied by Teknor Apex.

Manufacturing of films may be accomplished as follows. The film may be formed from non-orientable material or, if formed from an orientable (i.e. heat-shrinkable) material may be formed from a tube by using a "trapped bubble" technique commonly known as the "hot blown" technique. In forming a hot blown film, the tube is first stretched by a hot blown bubble essentially immediately after extrusion while the tube is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, are the planar methods of slot die extrusion or cast extrusion which, likewise, are well known to those in the art. If an oriented, i.e. heat-shrinkable, film is desired, the manufacture may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched, to orient or align the crystallites and/or molecules of the material and then cooled down. An "oriented" or "heat shrinkable" material is defined herein as a material which, when heated to an appropriate temperature above room temperature (for example 96° C.), will have a free shrink of about 5% or greater in at least one linear direction.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

As used herein the term "extrusion" or the term "extruding" is intended to include extrusion, coextrusion, extrusion coating, or combinations thereof, whether by tubular methods, planar methods, or combinations thereof.

If desired, the film of the invention may contain a barrier layer. The barrier layer may be composed of a layer comprising vinylidene chloride copolymer (saran), or composed of a layer comprising hydrolyzed ethylenevinyl acetate copolymer (EVOH), preferably hydrolyzed to at least about 50%, most preferably to greater than about 99%, or composed of both a layer comprising vinylidene chloride copolymer and a layer comprising EVOH. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being generally compatible with that of the other components of the multi-layer film, preferably in the range of about 3–10 (melt flow being determined generally in accordance with ASTM D1238). The gas of main concern is oxygen and transmission is considered to be sufficiently low, i.e. the barrier material is relatively gas impermeable, when the transmission rate for the barrier material is below 70 cc/m²/mil thickness/24 hours/atms, as measured according to the procedures of ASTM Method D-1434. EVOH can be advantageously utilized in the film of the invention since irradiative high energy electron treatment of the fully coextruded film does not degrade an EVOH barrier layer, as could be the case of a vinylidene chloride copolymer barrier layer, as is further discussed below. This gas "impermeability" of barrier polymers such as Saran or EVOH as described in this paragraph is intended only to be a reference to barrier polymers. It is not intended to be a reference to the gas "impervious" characteristic of one kind of support used in skin packaging as described above, although in some skin packaging applications it may be desirable to employ a barrier polymeric film as the support.

Irradiation is not necessary, as very suitable films exhibiting an excellent deep draw and a high draw ratio can be obtained without irradiation. Irradiative cross-linking, if desired, may be accomplished by the use of high energy electrons, ultra-violet rays, X-rays, gamma rays, beta particles, etc. Preferably, electrons are employed up to about 20 megarads (MR) dosage. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many other apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

Furthermore, those of skill in the art generally recognize that irradiation with high energy electrons is generally harmful to saran barrier layer compositions, as irradiation may degrade and discolor saran, making it turn brownish. Thus, if full coextrusion followed by high energy electron irradiation of the multi-layer structure is carried out on a film having a barrier layer containing a saran layer, the irradiation should be done at low levels with care. Alternatively, this situation may be avoided by using extrusion coating. Accordingly, by means of extrusion coating, one may first extrude or coextrude a first layer or layers, subject that layer or layers to high energy electron irradiation and thereafter extrusion coat the saran barrier layer and, for that matter, simultaneously or sequentially extrusion coat other later layers (which may or may not have been irradiated) onto the outer surface of the extruded previously irradiated tube. This sequence allows for the high energy electron irradiative treatment of the first and later layer or layers without subjecting the saran barrier layer to the harmful discoloration effects thereof.

Cross-linking of the polymers may also be accomplished chemically through utilization of chemical cross-linking agents, as is well known to those of skill in the art. For instance, cross-linking agents, such as organic peroxides or dialdehydes, have been used to cross-link polyethylene polymers and copolymers. A general discussion of chemical cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966.

DETAILED DESCRIPTION OF THE DRAWINGS

Referring to FIG. 1, a schematic view of an object 5 is shown skin packaged to a support 3. The object is of rectangular cross-section in the direction horizontal to the support. The support 3 is perforated Surlyncoated cardboard (not shown). The film 4 goes from the top 2 of the object 5, down to wherein portion 1 of the film covers the support 3.

Figure 2:
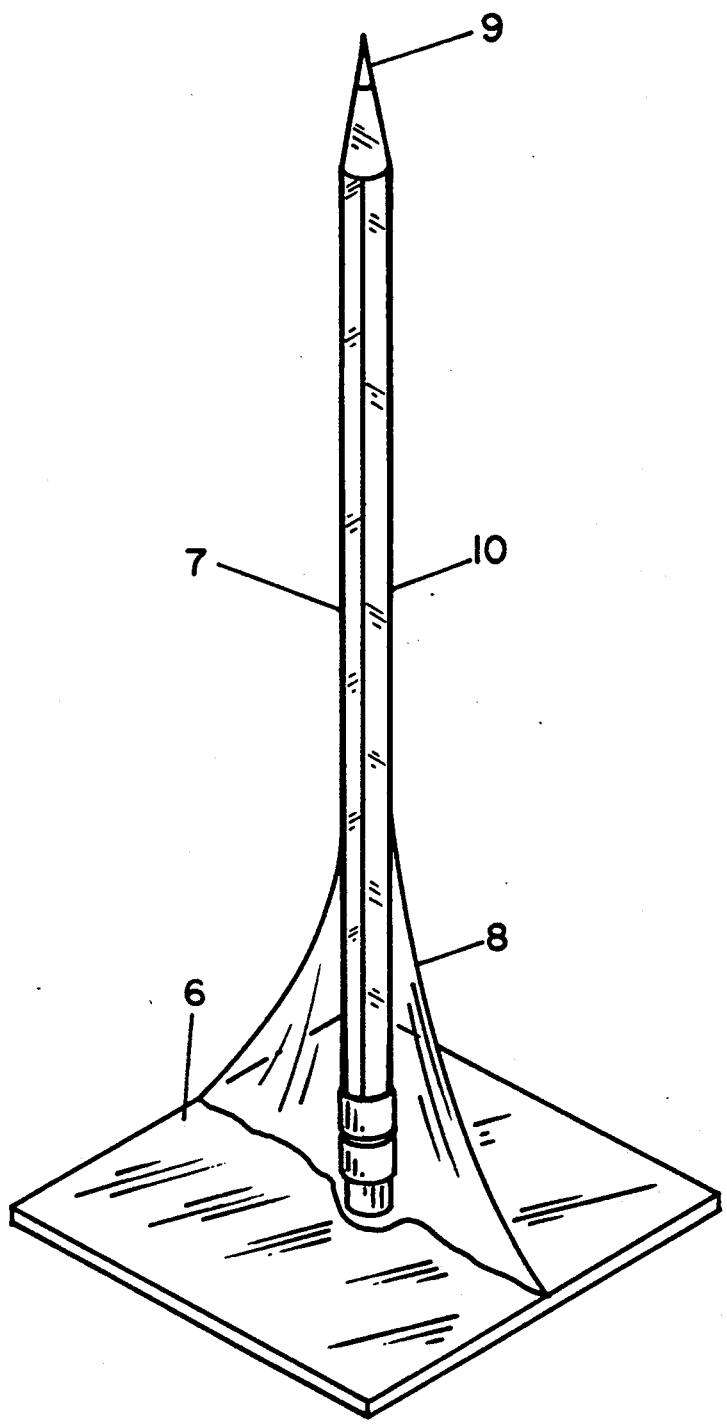
FIG. 2 is a schematic representation of a skin packaged, high profile sharpened pencil.

Referring to FIG. 2, a schematic view of a pencil 10 having sharpened point 9 is shown skin packaged with film 7 to support 6 with the point 9 in the direction away from support 6 and the eraser end adjacent support 6. The support 6 is Surlyn coated cardboard (not shown). Also shown is some webbing 8 of film 7 about ⅔ of the way down from point 9.

EXAMPLES

The following Examples illustrate the preferred embodiments of the invention. It is not intended to limit the invention thereby.

All percentages indicated in the Examples are percentages by weight, except the amount of Polyox was so small that it is indicated in parts per million (ppm).

The following materials were employed in the Examples;

Trycol (TM) 5984 is a polyethoxylated cetyl alcohol (PECA) supplied by Emery Industries.

Food grade (GMS) glyceryl monostearate CPH-53-N was supplied by C. P. Hall.

Alathon F-3445 is an EVA having about 3.5% vinyl acetate. It was supplied by du Pont.

Dow XU 61512.08L is a VLDPE supplied by Dow. The comonomer is octene; the melt index is 0.80, and the density is 0.905.

Dowlex (TM) 2045.04 is a linear low density polyethylene supplied by Dow Chemical Company, Midland, Mich. It has a density of 0.920±0.002; the comonomer is octene; and the melt index is 1.1. Hereinafter, this is referred to as LLDPE.04 for brevity.

Dowlex (TM) 2045.03 is a linear low density polyethylene supplied by Dow Chemical Company, Midland, Mich. It has a density of 0.920; the comonomer is octene; and the melt index is 1.1. Hereinafter, this is referred to as LLDPE.03 for brevity.

Chemplex 3404 is a LDPE supplied by Chemplex Company, Rolling Meadows, Ill.

EPE 8160 clear concentrate antiblock is a micron sized silica which is a blend by weight of 90% LDPE (Dow Resin 722) with 10% Syloid 378. The syloid is an infrared opaquefier supplied by Teknor Apex.

Polyox (TM) is polyethylene oxide (PEO) sold by Union Carbide.

EXAMPLE I

Using the method of slot die extrusion with a Pacemaker 3.5 inch (8.9 cm) slot die extruder supplied by National Rubber Manufacturers, a 20 mil (0.51 mm) thick film was made having the following composition:

TABLE I

| Ingredient (%) | PERCENTAGES | | |
|---|---|---|---|
| LLDPE.04 | 98.5 | | |
| PECA | 1.0 | 90% | 100% |
| GMS | 0.5 | | |
| PEO | 200 ppm | | |
| EPE 8160 | | 10% | |

Next, using skin packing machines supplied by Am-Pak, the following items were skin packaged with the film using a Surlyn-coated perforated cardboard backing board as a support:

a) wooden block of 2⅛ inches × 9 inches with the 9 inch length vertical to the cardboard; draw ratio was about 3.1:1;

b) lead brick of 2 inches × 4 inches × 8 inches with the 2 inch thickness vertical to the cardboard; draw ratio was about 0.5:1;

c) cylindrical soda can of 3⅝ inches diameter × 4¾ inches height with the 4¾ inch height vertical to the cardboard; draw ratio was about 2.3:1;

d) circuit board of 5 inches wide × ½ inch thick × 6 inches long with the ½ inch thickness vertical to the board; draw ratio was about 12:1;

e) capacitor of 2½ inches diameter × 4¼ inches height with the 4¼ inch height vertical to the cardboard and the capacitor had ½ inch tall multiple pointed pin connectors pointing in the vertical direction; draw ratio was about 1.7:1;

f) pointed wooden stick of ⅛ inch diameter × 8½ inches height with the 8½ inches height vertical to the cardboard; draw ratio was about 64:1;

g) pocket knife of about 3/16 inch × 6¾ inches height with the 6¾ inches height vertical to the cardboard and the exposed blade pointed up; draw ratio was about 36:1;

h) inductor can of 2½ inches × 2 inches with a 2 inch thickness vertical to the cardboard and the can had pins pointing up; draw ratio was about 1:1.

For all of these, the film was observed during skin packaging to draw well over sharp points and corners, exhibiting excellent deep draw strength and elongation. The film did not split during the skin packaging. This is particularly noted for the pointed wooden stick which exhibited an extremely high draw ratio of about 64:1. The packaged lead brick was turned over and held upside down several times. Although the brick weighed about 26 pounds 10 ounces (about 12.1 kg), the film immobilized the brick firmly, exhibited excellent strength in packaging a heavy object, and did not rip.

EXAMPLE II

The film of Example I above was tested for its antistatic property. The ability of each sample to dissipate a static charge was measured using the procedure described in Federal Test Method Standard 101C, Method 4046.1, "Electro-static Properties of Materials" (change notice dated Oct. 8, 1982) on a static decay meter. Such meters are commercially available, such as the 406C static decay meter supplied by Electrotech Systems, Inc. Except where differences are indicated, samples were equilibrated at about room temperature at less than about 15% relative humidity for about 24 hours. After equilibration, each was placed in a static decay meter at 72°–73° F. (22°–23° C.) and charged to ±5000 VDC (volts direct current) at less than about 15% relative humidity. The time for 99% of the charge to dissipate was then measured.

TABLE II

| Sample | Decay Time (milliseconds) |
| --- | --- |
| Film by itself | 725 |
| Film skin packaged around wooden block | 1585* |

*Decay time was tested on the side of the package from the tall axis

EXAMPLE III

Several 4-mil thick monolayer films were extruded by the hot blown method as described above. These films were as follows:

TABLE IIIA

| FILM | POLYMER | EPE 8160 | IRRAD (MR) |
| --- | --- | --- | --- |
| A1 | VLDPE 90% | 10% | None |
| A2 | VLDPE 90% | 10% | 6 |
| A3 | VLDPE 100% | | None |
| A4 | VLDPE 100% | | 6 |
| B1 | LLDPE.03 90% | 10% | None |
| B2 | LLDPE.03 90% | 10% | 6 |
| B3 | LLDPE.03 100% | | None |
| B4 | LLDPE.03 100% | | 6 |
| C1 | LDPE 90% | 10% | None |
| C2 | LDPE 90% | 10% | 6 |
| C3 | LDPE 100% | | None |
| C4 | LDPE 100% | | 6 |
| D1 | EVA 90% | 10% | None |
| D2 | EVA 90% | 10% | 6 |
| D3 | EVA 100% | | None |
| D4 | EVA 100% | | 6 |

Next, using an AmPak skin-packaging machine, various items were skin packaged. For draw ratios up to and including 7:1, stacks of cubic blocks were used; for draw ratios of 10:1 and above, rigid plastic cylinders were used. Ordinary children's wooden cubic blocks of about 1 inch × 1 inch × 1 inch (about 2.5 cm × 2.5 cm × 2.5 cm) were skin packaged with the various films to Surlyn-coated cardboard. Blocks were chosen because vertical stacking readily correlated to approximate draw ratio, i.e. a stack of 5 blocks was about a 5:1 draw ratio. At a ratio of 10:1, however, the AmPak machine did not have enough head room to continue with the blocks, so the rigid plastic cylinders were used. Deep draw for the particular draw ratio was rated as poor (the film split), good (the film did not split but did not draw tightly to the base) or excellent (the film drew tightly to the base and did not split). Adhesion was judged by relative cardboard fiber binding involvement of the Surlyn coated cardboard to the film when the film was pulled off the Surlyn-coated cardboard. The results are summarized in Table IIIB below:

TABLE IIIB

| FILM | DEEP DRAW RATIO | DEEP DRAW PERFORMANCE | | | ADHESION TO SURLYN-COATED CARDBOARD PERFORMANCE |
| --- | --- | --- | --- | --- | --- |
| | | POOR | GOOD | EXCELLENT | |
| A1 | 3:1 | | | x | NT* |
| | 4:1 | | | x | NT |
| | 5:1 | | | x | Sealed with few fibers bound |
| | 7:1 | | | x | NT |
| | 10:1 | | | x | Sealed with few fibers bound |
| | 12:1 | | x | | Sealed with few fibers bound |
| | 14:1 | | x | | Sealed with few fibers bound |
| | 16:1 | | x | | Sealed with few fibers |

TABLE IIIB-continued

| FILM | DEEP DRAW RATIO | DEEP DRAW PERFORMANCE | | | ADHESION TO SURLYN-COATED CARDBOARD PERFORMANCE |
|---|---|---|---|---|---|
| | | POOR | GOOD | EXCELLENT | |
| A2 | 3:1 | | | x | bound |
| | | | | | NT |
| | 4:1 | | | x | NT |
| | 5:1 | | | x | Poor Sealing |
| A3 | 3:1 | | | x | NT* |
| | 4:1 | | | x | NT |
| | 5:1 | | | x | Sealed with few fibers bound |
| | 7:1 | | | x | NT |
| | 10:1 | | | x | Sealed with few fibers bound |
| | 12:1 | | | x | Sealed with few fibers bound |
| | 14:1 | | | x | Sealed with few fibers bound |
| | 16:1 | | | x | Sealed with few fibers bound |
| A4 | 3:1 | | | x | NT |
| | 4:1 | | | x | NT |
| | 5:1 | | | x | Poor Sealing |
| B1 | 3:1 | | | x | NT |
| | 4:1 | | | x | NT |
| | 5:1 | | | x | Poor with few fibers bound |
| | 7:1 | | | x | NT |
| | 10:1 | | | x | Excellent with fibers bound |
| | 12:1 | | | x | Excellent with fibers bound |
| | 14:1 | | | x | Excellent with fibers bound |
| | 16:1 | | | x | Excellent with fibers bound |
| B2 | 3:1 | | | x | NT |
| | 4:1 | | | x | NT |
| | 5:1 | | | x | Very good with fibers bound |
| B3 | 3:1 | | | x | NT |
| | 4:1 | | | x | NT |
| | 5:1 | | | x | Sealed with some fibers bound |
| | 7:1 | | | x | NT |
| | 10:1 | | | x | Excellent with fibers bound |
| | 12:1 | | | x | Excellent with fibers bound |
| | 14:1 | | | x | Excellent with fibers bound |
| | 16:1 | | | x | Excellent with fibers bound |
| B4 | 3:1 | | | x | NT |
| | 4:1 | | | x | NT |
| | 5:1 | | | x | Sealed with some fibers bound |
| Comparison C1 | 3:1 | | | x | NT |
| | 4:1 | | | x | NT |
| | 5:1 | | | x | Sealed with some fibers bound |
| | 7:1 | | x | | NT |
| | 10:1 | x | | | Poor sealing |
| | 12:1 | x | | | Poor sealing |
| | 14:1 | x | | | Poor sealing |
| | 16:1 | x | | | Poor sealing |
| Comparison C2 | 3:1 | | | x | NT |
| | 4:1 | | | x | NT |
| | 5:1 | | | x | Very good with fibers bound |
| | 6:1 | | x | | NT |
| | 7:1 | x | | | NT |
| Comparison C3 | 3:1 | | | x | NT |
| | 4:1 | | | x | NT |
| | 5:1 | | | x | Poor with few fibers bound |
| | 7:1 | | x | | NT |
| | 10:1 | x | | | Poor sealing |
| | 12:1 | x | | | Poor sealing |
| | 14:1 | x | | | Poor sealing |
| | 16:1 | x | | | Poor sealing |
| Comparison | 3:1 | | | x | NT |

TABLE IIIB-continued

| FILM | DEEP DRAW RATIO | DEEP DRAW PERFORMANCE | | | ADHESION TO SURLYN-COATED CARDBOARD PERFORMANCE |
|---|---|---|---|---|---|
| | | POOR | GOOD | EXCELLENT | |
| C4 | 4:1 | | | x | NT |
| | 5:1 | | | x | Sealed with some fibers bound |
| | 6:1 | | | x | NT |
| | 7:1 | | | x | NT |
| Comparison D1 | 3:1 | | x | | NT |
| | 4:1 | x | | | NT |
| | 5:1 | x | | | Poor with few fibers bound |
| Comparison D2 | 3:1 | | x | | NT |
| | 4:1 | | x | | NT |
| | 5:1 | | x | | Poor with few fibers bound |
| | 7:1 | | x | | NT |
| Comparison D3 | 3:1 | | x | | NT |
| | 4:1 | x | | | NT |
| | 5:1 | x | | | Poor with few fibers bound |
| Comparison D4 | 3:1 | | x | | NT |
| | 4:1 | | x | | NT |
| | 5:1 | | x | | Poor with few fibers bound |
| | 7:1 | | x | | NT |

*NT = Not Tested

As can be seen from Table IIIB, the deep draw ratio was excellent for VLDPE, LLDPE and LDPE (film samples A1 through C4), but only good or poor for EVA (film samples D1 through D4). Thus, the deep draw of the linear ethylene/alpha-olefin films of the invention was superior to that of EVA. Also, irradiation improved the adhesion to the Surlyn-coated cardboard for LLDPE, LDPE, and EVA.

Next, it was illustrated that the linear ethylene/alpha-olephin films of invention were superior to conventional LDPE films. With the VLDPE, LLDPE and LDPE (but not EVA) films, pencils (like that illustrated in FIG. 2 but not sharpened) were skin packaged in the vertical direction. The pencils had a diameter of about 0.29 inch (about 0.74 cm) and a height of about 7.5 inches (19.1 cm). The blunt, unsharpened end of the pencils was away from the cardboard and the eraser end was adjacent the cardboard. Webbing occurred about half way down the pencils. The results are summarized in Table IIIC below:

While it is not intended to be bound to any theory, it is believed this was due to the irradiation making the film so tough that it pulled the pencil instead of allowing it to remain substantially vertical.

All the LDPE film samples (C1 to C4) exhibited poor deep draw and ripped open at an attempted draw ratio of 26:1, whereas the VLDPE film samples (A1 to A4) and LLDPE film samples (B1 to B4) exhibited excellent deep draw at a draw ratio of 26:1. Thus the deep draw of the linear ethylene/alpha-olefin films of the invention is superior to that of conventional LDPE.

While certain representative embodiments and details have been shown for the purpose of illustration, numerous modifications to the formulations described above can be made without departing from the invention disclosed.

What is claimed is:

1. A skin packaging process for packaging an electrostatically sensitive item comprising:
   (a) placing the item to be packaged on a support;

TABLE IIIC

| FILM | DEEP DRAW RATIO | DEEP DRAW PERFORMANCE | | | ADHESION TO SURLYN-COATED CARDBOARD PERFORMANCE |
|---|---|---|---|---|---|
| | | POOR | GOOD | EXCELLENT | |
| A1 | 26:1 | | | x | Tacky but no fibers |
| A2* | 26:1 | | | x | Some fiber involvement |
| A3 | 26:1 | | | x | Tacky but no fibers |
| A4* | 26:1 | | | x | Some fibers and cardboard delamination |
| B1 | 26:1 | | | x | Very modest fiber involvement |
| B2* | 26:1 | | | x | Some fiber involvement |
| B3 | 26:1 | | | x | Very modest fiber involvement |
| B4* | 26:1 | | | x | Some fibers and cardboard delamination |
| C1 | attempted 26:1 | x | | | Tacky but no fibers |
| C2* | attempted 26:1 | x | | | Some fibers and cardboard delamination |
| C3 | attempted 26:1 | x | | | Tacky but no fibers |
| C4* | attempted 26:1 | x | | | Some fibers and cardboard delamination |

*Irradiated at 6 MR.

All irradiated skin packaged pencils listed to an angle of about 20° to 30° from the cardboard base support.

(b) positioning a film above said item;
(c) heating the film;
(d) drawing a vacuum between said film and said support; and
(e) drawing the film over and around the item forming a heat seal with the support;
(f) wherein said film comprises an antistatic linear ethylene/alpha-olefin copolymer film and wherein said linear ethylene/alpha-olefin copolymer is a blend with one or more antistatic agents chosen from (a) one or more fatty acid esters of polyhydroxy alcohols, (b) one or more polyalkoxylated compounds, or a mixture of (a) and (b).

2. A skin packaging process for packaging an electrostatically sensitive item comprising:
(a) placing the item to be packaged on a support;
(b) positioning a film above said item;
(c) heating the film;
(d) drawing a vacuum between said film and said support; and
(e) drawing the film over and around the item forming a heat seal with the support;
(f) wherein said film comprises an antistatic linear ethylene/alpha-olefin copolymer film and wherein said linear ethylene/alpha-olefin copolymer is in blend with glycerol monostearate, polyethoxylated cetyl alcohol, and polyethylene oxide.

* * * * *